United States Patent [19]

Kitagawa

[11] 4,250,348
[45] Feb. 10, 1981

[54] CLAMPING DEVICE FOR CABLES AND THE LIKE

[75] Inventor: Hiroji Kitagawa, Nagoya, Japan

[73] Assignee: Kitagawa Industries Co., Ltd., Nagoya, Japan

[21] Appl. No.: 974,226

[22] Filed: Dec. 29, 1978

[30] Foreign Application Priority Data

Jan. 26, 1978 [JP] Japan ............................. 53-8323[U]

[51] Int. Cl.³ ............................................. F16L 21/02
[52] U.S. Cl. ............................. 174/65 SS; 285/161; 285/322; 285/343
[58] Field of Search .................. 174/65 SS; 285/158, 285/161, 162, 217, 322, 343

[56] References Cited

U.S. PATENT DOCUMENTS

| 2,540,368 | 2/1951 | Harding | 285/343 |
| 3,668,612 | 6/1972 | Neporim | 174/65 SS |
| 3,895,832 | 7/1975 | Ellis et al. | 285/322 |
| 4,145,075 | 3/1979 | Holzmann | 285/322 X |

Primary Examiner—B. A. Reynolds
Assistant Examiner—D. A. Tone

Attorney, Agent, or Firm—Armstrong, Nikaido, Marmelstein & Kubovcik

[57] ABSTRACT

A locking device is disclosed, which comprises a hollow cylindrical body having a plurality of annularly disposed independent gripping pieces projected from one end thereof and a clamping pipe threadably engageable about the outer periphery of the cylindrical body about its side of the gripping pieces. An elastic packing pipe is provided by fitting in contact with the inner circumferential faces of the gripping pieces, and the clamping pipe is tapered about the inner circumferential face of an end portion thereof so that about the outer periphery of their top end portions, the gripping pieces can abut against and be pressed radially toward the center of the device by the tapered end portion of the clamping pipe. Also, means such as notches and/or projections directed opposite to the lead direction of the male screw of the cylindrical body are provided, by which the top end portions of gripping pieces and the tapered portion of the clamping pipe are mutually fixed. This locking device is advantageously used for locking a cable or the like to a fixing member such as a wall.

12 Claims, 6 Drawing Figures

CLAMPING DEVICE FOR CABLES AND THE LIKE

BACKGROUND OF THE INVENTION

The present invention relates to a locking device for fixing to a supporting member linear articles such as cabtyre cables or other cables and the like while restricting their movement in their lengthwise direction.

In the wiring of cables such as cabtyre cables or the like, they are often inserted through holes formed through switch boxes or wall plates or stopped or supported onto wall plates or the like. Although their movement in the lengthwise direction may be allowed in some cases, generally in more cases such movement is not desirable.

For fixing cables or the like to fixing members such as wall plates, an expedient can be taken to simply fix cables or the like by using metal fittings such as nails, but in often cases a cable locking device composed of an insulating material is used. However, conventional cable locking devices are insufficient in the capacity of holding cables against a force of pulling the cables in the lengthwise direction thereof. Moreover, a variety of locking devices differing in the inner diameter are required to lock cables of different diameters.

Also, various collect attachments are known as means for fixing articles other than cables, but they are still insufficient in the capacity of fixing those articles to fixing members assuredly.

For example, in the specification of U.S. Pat. No. 3,163,692, a lead-in bushing for electrically connecting wires is disclosed and known. In this fixing device, a cylindrical hollow body portion is fixed to a casing, a tightening cap is screwed to the body portion, and an O-ring is interposed between the body portion and tightening cap. In this fixing device, however, the external lead is held only by deformation of the O-ring composed of a silicone rubber or the like. Even if this device, which is for electrical connections, is used for fixing cables or the like, no sufficient fixation can be attained.

SUMMARY OF THE INVENTION

It is a primary object of the present invention to provide a locking device which can fix cables such as cabtyre cables and the like in a prescribed position while permanently restricting their movement in the lengthwise direction.

Another object of the present invention is to provide a locking device which can be used even if the sizes or diameters of cables and the like are changed, namely irrespective of the kinds of cables and the like, and in which fixation and release of cables and the like can be accomplished very easily.

Still another object of the present invention is to provide a locking device which has a high reliability in such as water-proofing, oil-proofing and dust-proofing actions.

Other objects of the present invention will become apparent from the description given hereinafter.

In accordance with the present invention, these objects can be attained by a locking device comprising essentially a hollow cylindrical body having a male screw formed on the outer peripheral surface thereof and a clamping pipe having on the inner circumferential surface thereof a female screw to be engaged with said male screw of the cylindrical body, wherein a plurality of independent gripping pieces are annularly arranged on one end of the cylindrical body and projected from said one end, in each gripping piece a notched portion is formed on the inner circumferential face except the top end portion to form an elastic leg of the gripping piece, a packing pipe is fitted in the notched portions of said elastic legs of the gripping pieces, the top end portions of the gripping pieces have on the peripheral facesesshereof means for stopping and holding the clamping pipe in a direction reverse to the lead direction of the male screw, a taper is formed on the inner circumferential face of the end portion of the clamping pipe so that the peripheral face of the top end portion of each gripping piece is pressed to and contacted with said taper, and the clamping pipe has means to be engaged with the gripping pieces on said taper, the arrangement being such that the clamping pipe is fitted from the top end portions of the gripping pieces and screwed to the cylindrical body, whereby the top end portions of the gripping pieces are pressed in the central direction to cause a diameter-diminishing deformation in the packing pipe.

Various modifications and changes such as described hereinafter may be made to the locking device of the present invention without departing from the spirit of the present invention, and the locking device of the present invention can be advantageously used for locking cables.

DETAILED DESCRIPTION OF THE PREFERRED EMBODIMENTS

Figure 1:
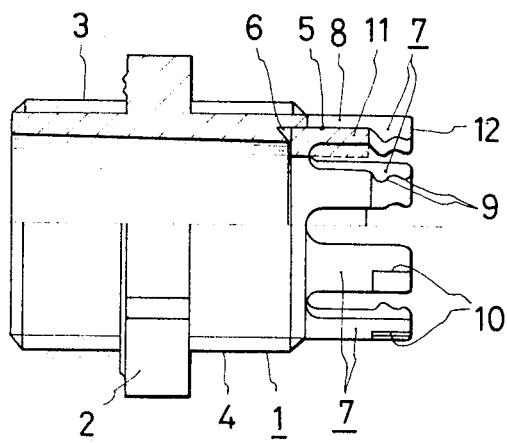
FIG. 1 is a partially cut-out side view, showing an embodiment of the cylindrical body of the locking device of the present invention.
Figure 2:
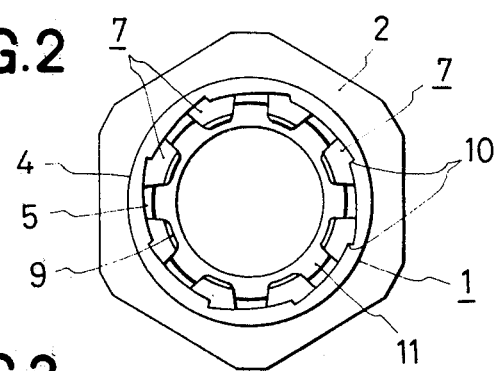
FIG. 2 is a front view showing the cylindrical body of FIG. 1.

FIG. 1 is a partially cut-out side view, illustrating the hollow cylindrical body which is one structural member of the locking device of the present invention, and FIG. 2 is a front view showing this hollow cylindrical body.

The cylindrical body 1 is formed to have a hollow structure so that a cable or the like is inserted therethrough. An engaging flange 2 is projected in the midway of the lengthwise direction on the peripheral face of the cylindrical body 1. Provision of this engaging flange 2 is not absolutely necessary, but this engaging flange 2 is effective as a stopper for a clamping pipe to be screwed to the cylindrical body 1 and for fixing the locking device to a wall plate or the like. In this case, a small projection may be formed or a washer may be disposed on the side falling in contact with the wall plate. Male screws 3 and 4 are formed on the outer peripheral face of the cylindrical body 1, and the male screw 4 is engaged with a female screw on the inner circumferential face of the clamping pipe and the male screw 3 may be screwed directly to a wall plate or the like or a fastening nut may be fitted thereto. Instead of the male screw 3, a female screw may be formed on the inner circumferential face of the cylindrical body so that a tubular bolt for fixing the cylindrical body 1 to a wall plate or the like is fitted thereto. Thus, means for fixing the cylindrical body 1 to a fixing member such as a wall member may be mounted or formed on one end portion of the cylindrical body 1.

At the other end of the cylindrical body on the side of the male screw 4, a plurality of independent gripping pieces 7 are projected, which are annularly arranged and formed integral with the cylindrical body. In each of these gripping pieces 7, a notched portion 5 is formed by cutting off the inner circumferential face except the top end portion 12 thereof to form an elastic leg 8, which has a function of bending the gripping piece 7 radially inwardly.

An annular packing pipe 11 composed of an elastic material such as rubber is fitted within this notched portion formed on the inner circumferential face of the elastic leg 8. The packing pipe 11 may have smooth and uniform outer and inner circumferential faces, or convexities or concavities may be formed on those faces. Further, an annular projection (not shown) extending in the central direction may be formed on the inner circumferential face to ensure an increased degree of clamping of a cable or the like.

The packing pipe 11 is applied by fitting within the notched portion 5 with the lateral ends thereof abutting against side walls of the notched portion, and in this connection it is preferred to have the notch portion 5 extended relatively deep longitudinally into the cylindrical body 1 and have the cylindrical body formed with an annular groove 6 so that the inner end portion of the tubular packing 11 becomes received within the groove 6 as the packing 11 undergoes deformation decreasing in its diametral size. It also is preferred that the annular groove 6 has a sectional configuration radially greater towards the outside, like an acute angle sectional shape as shown in FIG. 1, so that the packing pipe 11 can be received in the annular groove 6 more about the outer end portion thereof than about the inner portion thereof.

Further, a projection 9 is formed on the inner circumferential face of the top end portion 12 of the gripping piece 7, and on the outer peripheral face of the top end portion 12 there is formed a stopping and fixing notch 10 for stopping and fixing the clamping pipe in a direction reverse to the lead direction of the male screw 4. The projection 9 may be of one stage or of more than two stages. The stopping and fixing notch 10 is to engage with the projection formed on a tapered portion of the clamping pipe, as will be described hereinafter, and accordingly it may comprise a projection formed on the outer peripheral face of the top end portion 12, instead of the notch 10.

Figure 3:
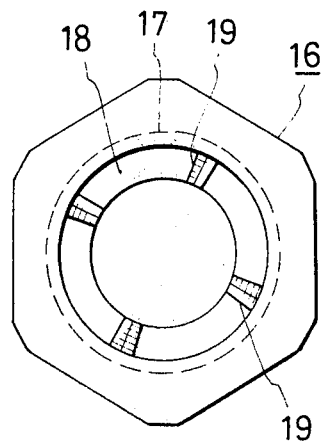
FIG. 3 is a back view, illustrating an embodiment of the clamping pipe of the locking device of the present invention.
Figure 4:
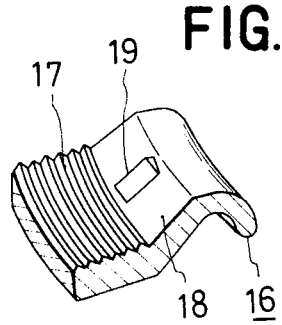
FIG. 4 is a perspective view, showing a part of the clamping pipe, which is partially cut out so that the interior can be seen.

FIG. 3 is a view showing the clamping pipe seen from the back side, and FIG. 4 is a perspective view of a portion cut out of the clamping pipe. The clamping pipe 16 is to be fitted to the cylindrical body 1 from the top end of the respective gripping pieces 7 and threadably engaged therewith, and it is formed on its inner circumferential face with a female screw 17 engageable with the male screw 4 of the cylindrical body 1. The inner circumferential face of the portion of the clamping pipe 16 continued from the female screw 17 is tapered as shown at 18, against which tapered portion the outer peripheral face of the end portion 12 of the respective gripping pieces 7 abuts. On this tapered portion 18, a plurality of stopping and fixing projections 19 are formed, preferably in an equidistantly spaced arrangement. The stopping and fixing projections 19 are engaged with the stopping and fixing notches 10 of the gripping pieces 7. These projections 19 may be replaced by stopping and fixing notches when projections or the like are formed instead of the above-mentioned stopping and fixing notches 10. In short, these projections and notches are not particularly critical insofar as they constitute means capable of preventing involuntary reverse rotation of the clamping pipe 16 by the engagement thereof. The number of the stopping and fixing notches 10 may be the same as or different from that of the stopping and fixing projections 19. The depth of the notches 10 and the height of the projections 19 are set so that the clamping pipe 16 does not spontaneously become loosened, and in the present invention, the notches 10 and the projections 19 may be arranged so that the clamping pipe 16 can be optionally released by applying a force in a direction opposite to the lead direction of the male screw 4, or there may be adopted threadably engaging members capable of completely preventing reverse rotation of the clamping pipe 16.

Procedures of locking a cable by using the locking device of the present invention will now be described with reference to the embodiment illustrated in FIGS. 5 and 6.

The one end portion of the cylindrical body 1 where the male screw 3 is formed is inserted into a through hole formed to a switch box or other wall plate 14 and the clamping nut 13 is screwed to the male screw 3 to fix the wall plate 14 between the nut 13 and the engaging flange 2.

Figure 5:
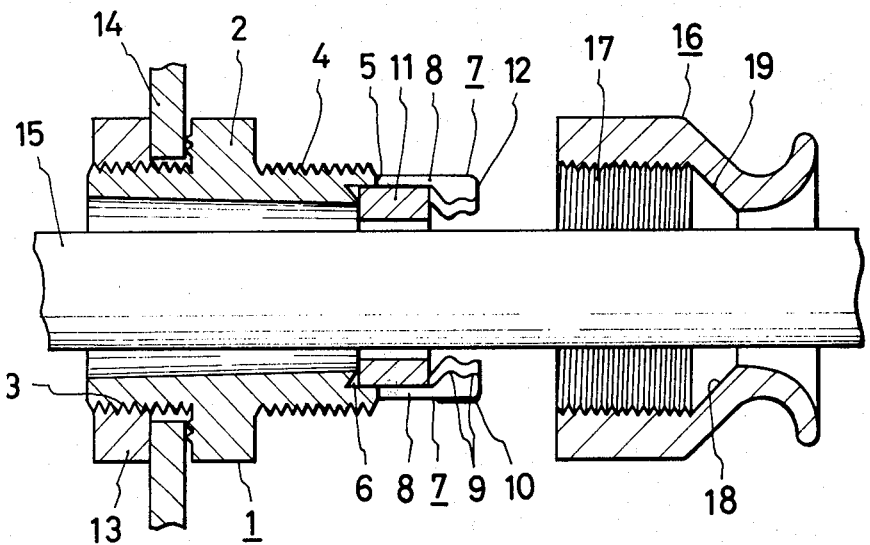
FIG. 5 is a longitudinal sectional view, showing the state of the cylindrical body and clamping pipe before screwing, namely before locking.
Figure 6:
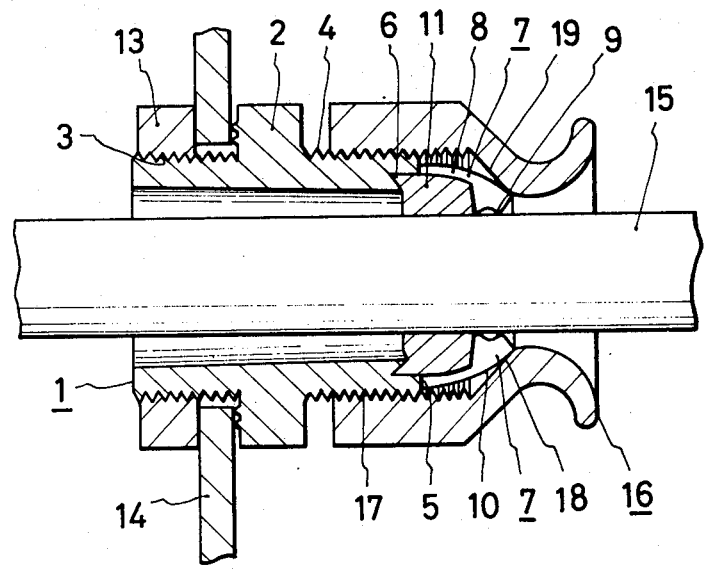
FIG. 6 is a longitudinal sectional view, showing the state where the cylindrical body and clamping pipe are locked.

Then, a cable 15 is passed through the cylindrical body 1 and clamping pipe 16 as shown in FIG. 5. The clamping pipe 16 is outwardly fitted from the top end portions 12 of the gripping pieces 7 and the female screw 17 is engaged with the male screw 4. As a result, the outer peripheral faces of the gripping pieces 7 are urged to and contacted with the tapered portion 18, and respective elastic legs 8 are bent relatively softly to permit the top end portions 12 including projections 9 to be urged toward the center. Simultaneously, the clamping pipe 16 is allowed to advance along the lead of the male screw 4 while the stopping and fixing projections 19 are being kept in contact with the stopping and fixing notches 10, and the packing pipe 11 is deformed with the bending of the elastic legs 8 to press the outer peripheral face of the cable 15 as shown in FIG. 6.

When the clamping pipe 16 is thus driven to advance to an utmost limit, by engagement between the fixing and stopping projections 19 and notches 10 any involuntary reverse rotation of the clamping pipe 16 can be prevented from occurring and such locking state of the cable 16 as will not allow the movement of the cable 15 in the lengthwise direction is permanently held.

As pointed out hereinbefore, the locking device of the present invention comprises essentially the cylindrical body 1 and the clamping pipe 16. According to the present invention, as the clamping pipe 16 is screwed deeper, the top end portions 12 of gripping pieces 7 are urged in the radially central direction by the tapered portion 18 of pipe 16 to bend the elastic legs 8 and simultaneously cause a diameter-diminishing deformation in the packing pipe 11 composed of rubber or the like. Accordingly, without using a particular tool, the packing pipe 11 can be pressed about the outer peripheral face of the cable 15 to lock the latter.

By the provision of the annular groove 6, into which a portion of packing pipe 11 can be received at the time of the above-mentioned deformation thereof, the inner circumferential face of the packing pipe 11 can be pressed partially more tightly against the cable 15 by the presence of this annular groove 6 together with bending of the elastic legs 8, and the cable 15 can be held and locked very stably and assuredly.

The stopping and fixing notches 10 and projections 19 prevent reverse rotation of the clamping pipe 16, and the degree of bending of the gripping pieces 7 integrally formed with the cylindrical body 1 and the degree of the diameter-diminishing deformation of the packing pipe 11 can be controlled by adjusting the degree of screwing of the clamping pipe 16. Therefore, various cables 15 differing in the diameter can be effectively locked by the locking device of the present invention, and even if a pulling force is applied to the locked cable 15, the movement of the cable in the lengthwise direction can be prevented against such pulling force by the lock-holding action attained by the engagement between the stopping and fixing notches 10 and projections 19.

The packing pipe 11 is located on the inside of the cylindrical body 1 and clamping pipe 16, and it has such a structure that it is held and fixed by the notched portions 5 of the gripping pieces 7. Accordingly, the reliability with respect to such actions as water-proofing, oil-proofing and dust-proofing can be remarkably increased. Further, if the packing pipe may be damaged or broken and such actions are not attained, it can easily be replaced by a new packing pipe.

The cylindrical body and clamping pipe of the locking device of the present invention may be prepared from an insulation material, and in this case, the locking device can be used effectively for fixing and locking cables and the like.

The scope of the present invention is not limited by the above-mentioned embodiments shown in FIGS. 1 to 6, and various modifications and changes may be made to those embodiments without departing from the spirit of the present invention.

What is claimed is:

1. A locking device comprising essentially a hollow cylindrical body having a male screw formed about the outer periphery thereof and a clamping pipe having about the inner circumferential face thereof a female screw engageable with said male screw of the cylindrical body, said cylindrical body having a plurality of annularly arranged independent gripping pieces projected from one side end of the body, said gripping pieces including notched portions formed about the inner circumferential face of their portions excluding the top end portion to form elastic leg portions;

said elastic leg portions receiving a packing pipe fitted in the notched portion thereof, the respective ends of said packing pipe abutting onto the respective side walls of said notched portion of the gripping pieces, said gripping pieces further having about the outer periphery at the top end portion thereof means for stopping and fixing the clamping pipe in the direction opposite to the lead direction of the male screw of the cylindrical body comprising a notch in the outer circumferential surface of each elastic leg portion, said clamping pipe being formed about the inner circumference of one end portion thereof with a tapered portion to which the outer periphery of the top end portion of each gripping piece abuts, and having at said tapered portion at least one wedge-shaped member engageable with said notches on the gripping pieces in a ratchet-like manner, wherein the clamping pipe is applied from the top end of the gripping pieces of the cylindrical body and threadably engaged with the cylindrical body, whereby top end portions of gripping pieces are pressed radially toward the center of the locking device to cause the packing pipe to undergo deformation to decrease in its diametral size, said top end portions being sized and spaced so as not to overlap each other, an annular groove being formed at the side end portion of said notched portion and extending toward the cylindrical body, said annular groove being empty before deformation of said packing pipe and receiving therein an end portion of said packing pipe as the pipe undergoes deformation to decrease its diametral size.

2. A locking device according to claim 1, wherein said annular groove has a sectional configuration deeper radially toward the outside of the cylindrical body so that the packing pipe can be received within the groove more about its radially outer end portion than its other portion.

3. A locking device according to claim 1, wherein said gripping pieces have projections about the inner circumferential face of top end portions thereof.

4. A locking device according to claim 1, wherein said packing pipe is composed of a rubber having a high elasticity.

5. A locking device according to claim 1, wherein said packing pipe includes an annular projection extending radially toward the center of the locking device.

6. A locking device according to claim 1, wherein said cylindrical body has an engaging flange projected about the outer periphery thereof, at a longitudinaly intermediate portion thereof.

7. A locking device according to claim 1, wherein said cylindrical body has at its other end portion opposite of said one end a fixing means for securing the cylindrical body onto a fixing member.

8. A locking device according to claim 7, wherein said fixing means comprises a male screw threaded about the outer periphery of said its other end.

9. The locking device of claim 7 wherein said fixing means is a clamping nut threadably engaged to said other end of the cylindrical body.

10. The locking device of claim 7, wherein said fixing means comprises a female screw threaded on the inner periphery of said other end of the cylindrical body.

11. A locking device according to claim 1, wherein said gripping pieces are formed integrally with said cylindrical body.

12. A locking device according to claim 1, wherein both said cylindrical body including gripping pieces and said clamping pipe are composed of an insulation material.

* * * * *